United States Patent [19]
Pal et al.

[11] Patent Number: 5,434,783
[45] Date of Patent: Jul. 18, 1995

[54] ACTIVE CONTROL SYSTEM

[75] Inventors: Chinmoy Pal, Yokohama; Ichiro Hagiwara, Kamakura, both of Japan

[73] Assignee: Nissan Motor Co., Ltd., Yokohama, Japan

[21] Appl. No.: 176,439

[22] Filed: Jan. 3, 1994

[30] Foreign Application Priority Data

Jan. 6, 1993 [JP]  Japan ................... 5-000578

[51] Int. Cl.$^6$ .............................................. G06F 15/00
[52] U.S. Cl. ................... 364/424.05; 364/508; 280/707
[58] Field of Search ............ 364/424.05, 424.01, 364/508; 395/21, 22, 23; 280/707, 840; 180/197

[56] References Cited

U.S. PATENT DOCUMENTS

| | | | |
|---|---|---|---|
| 5,200,898 | 4/1993 | Yuhara et al. | 364/431.05 |
| 5,247,445 | 9/1993 | Miyano et al. | 364/431.12 |
| 5,285,523 | 2/1994 | Takahashi | 395/22 |
| 5,313,407 | 5/1994 | Tiernan et al. | 364/508 |

FOREIGN PATENT DOCUMENTS

| | | |
|---|---|---|
| 4-149605 | 5/1992 | Japan . |
| 2149614 | 6/1985 | United Kingdom . |

*Primary Examiner*—Kevin J. Teska
*Assistant Examiner*—Susan Wieland
*Attorney, Agent, or Firm*—Foley & Lardner

[57] ABSTRACT

An active control system is provided with an actuator which controls a noise and/or vibration state of an automotive vehicle, a detector which detects the noise and/or vibration state of the vehicle, and a control unit which receives an output signal of the noise and/or vibration state detector and outputs a signal to control the actuator, the control unit having a neural net which compares a control predicted value based on the output signal with a control target value so that a correction for connection weights in the neural net is carried out on the basis of the comparison result.

28 Claims, 9 Drawing Sheets

ACTIVE CONTROL SYSTEM

BACKGROUND OF THE INVENTION (1) Field of the Invention

The present invention relates to an active control system, for actively reducing noises in a vehicular compartment and/or vehicular body vibrations, applicable to an automotive vehicle in order to enhance the riding comfortability.

(2) Description of the Background Art

A previously proposed kind of active control system is exemplified by a British Patent Application Publication No. 21 49 614.

The previously proposed active control system disclosed in the above-identified British Patent Application Publication is applied to an actively noise controlling system for an enclosed space such as a vehicular compartment or cabin of an airplane.

That is to say, a number of loud speakers and microphones are installed within the enclosed space. The loud speakers serve to generate control sounds to be interfered with noises and tile microphones serve to measure a residual error signal (residual noise). A signal processor is connected to the loud speakers and microphones. The signal processor receives a basic frequency of a noise source measured by basic frequency measuring means and input signals from the microphones and outputs control sound signals to the loud speakers so as to minimize a sound pressure level within the enclosed space. Although three loud speakers and four microphones are installed within the enclosed space, it is now assumed that the numbers of the loud speakers and the microphones are single, respectively, in order to simplify the explanation of the active noise controlling system.

Suppose now that a transfer function from the noise source to the microphone is H, a transfer function from the loud speaker to the microphone is C, and a sound source information signal generated by the noise source is $X_p$, the residual error signal E is expressed as:

$$E = X_p \cdot H + X_p \cdot G \cdot C$$

It is noted that, in the above equation, G denotes a transfer function required to cancel the noise sound.

When the noise is perfectly canceled at a point of location at which the noise is to be canceled, $E = 0$.

At this time, $G = -H/C$.

Then, the transfer function G is determined which minimizes the microphone detected signal E and filter coefficients of a filter disposed in the signal processor are adaptively updated on the basis of the transfer function G. Means for deriving the filter coefficients so as to minimize the microphone detected signal E includes an LMS (Least Mean Square) algorithm which is a kind of a steepest descent method.

When the number of microphones are installed within the enclosed space, the noises are controlled so as to minimize a total sum of the signals detected by means of the respective microphones.

According to the control procedure described above, a canceling sound is output having a phase opposite to the enclosed noise in the vehicular compartment so that the canceling sound cancels the enclosed noise.

The above-described previously proposed active noise controlling system is effective in a case where a single noise source generating stationary deterministic signals such as a sinusoidal signal component, for example, a noise generated from an engine mounted in the automotive vehicle.

However, the noises in the vehicular compartment during the vehicle run include various types of noises such as a noise involved in engine revolutions, so-called road noise transmitted from vehicular suspensions, so-called wind noise generated at a vehicular exterior during the vehicle run, exhaust noise and, in this addition, these noises are random characteristics. Hence, in the previously proposed noise controlling system, the noise control is carried out with the sinusoidal (sin) signal component of the noise involved in the engine revolutions as a reference signal, noise components except an object to be controlled are added whenever the calculation of the noise canceling sound is carried out so that a divergence of control would be brought out. In this case, an increase of noise level would often be brought out.

In addition, although the active control system described above is applicable to a vibration control system for the vehicular suspensions other than the actively noise controlling system, vibration inputs to vehicular suspension units have random characteristics. It is difficult for the previously proposed active control system to appropriately control vibrations of such vehicular suspension units as described above.

SUMMARY OF THE INVENTION

It is an object of the present invention to provide an active control system in which a neural network is adopted, which can appropriately achieve the reduction of noises generated from a number of noise sources even if the noises generated from the number of noise sources are so aggregated and have random characteristics and which can appropriately suppress vibrations of vehicular suspension units having the random characteristics so as to enhance the riding comfortability.

The above-described object can be achieved by providing an active control system comprising: a) an actuator which is so constructed as to control a noise and/or vibration state and rigid body motion dynamics of an automotive vehicle; b) noise and/or vibration state and rigid body motion dynamics detecting means for detecting the noise and/or vibration state of the vehicle and producing a signal indicative of the sound vibration state; and c) a control unit using a neural net which is so constructed as to receive the signal from said sound vibration state detecting means and compare a control predicted value based on the sound vibration indicative signal with a control target value so as to correct a parameter of the neural net.

The above-described object can also be achieved by providing an active control system comprising: a) a control sound source which is so constructed as to generate a control sound to be interfered with noises in a vehicular compartment to reduce the noises; b) noise state detecting means for detecting a noise state and produce a signal indicative of the noise state; and c) a control unit using a neural net which is so constructed as to receive the noise state indicative signal and compare a control predicted value based on the noise state indicative signal with a control target value to correct at least one parameter of the neural net.

The above-described object can also be achieved by providing an active control system comprising: a) a vibration control unit which is so constructed as to provide control forces for suspension units of an automotive vehicle to reduce vibrations; b) vibration state detecting devices for detecting vibration states for the suspension units of the vehicle and for producing signals indicative of the vibration states; and c) a control unit using a neural net which is so constructed as to receive the vibration state indicative signals and to compare control predicted values based on the vibration state indicative signals with control target values to correct at least one parameter of the neural net.

DETAILED DESCRIPTION OF THE PREFERRED EMBODIMENTS

Reference will hereinafter be made to the drawings in order to facilitate a better understanding of the present invention.

Figure 1:
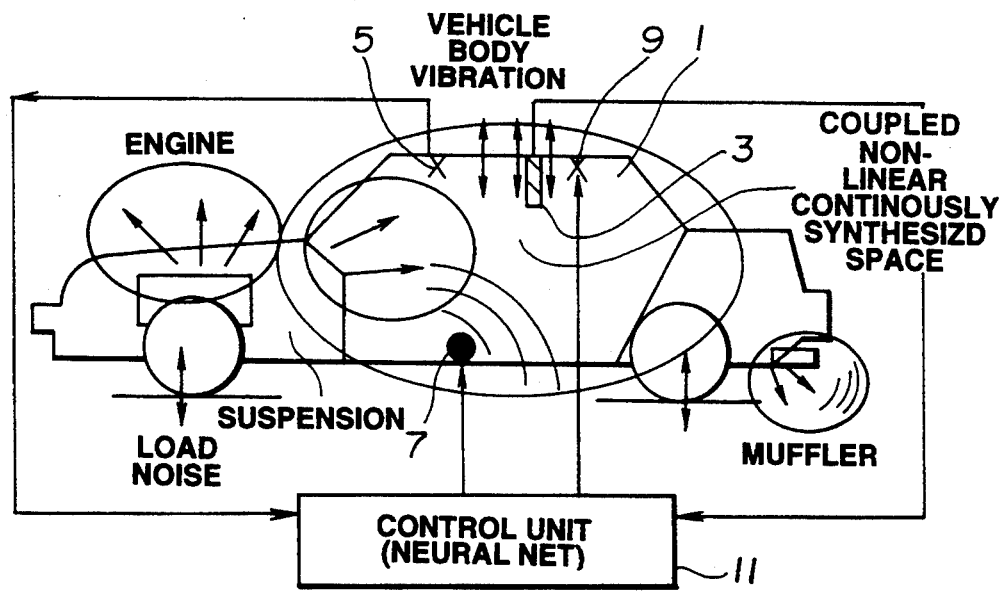
FIG. 1 is a schematic block diagram of a first preferred embodiment of an active control system according to the present invention.

FIG. 1 shows a rough sketch of a whole active noise control system in a first preferred embodiment to which an active control system according to the present invention is applicable.

Noises generated from a vehicular engine, road noises generated from vehicular suspension units, exhaust noises generated from a vehicular muffler, noises generated from a vehicular exterior ( so-called, wind noises ), and vibrations on a vehicular body panel, are synthesized within a vehicular compartment so as to constitute a coupled non-linear continuously synthesized space. A microphone 3 and piezoelectric element sensor 5 are installed, both of which constitute noise and/or vibration state detecting means (noise state detecting means) to detect the noise state as a sound vibration state within the vehicular component 1 as the coupled non-linear and continuously synthesized space.

An actuator which controls the sound vibration state of the automotive vehicle includes a loud speaker 7 disposed within the vehicular compartment 1, the loud speaker 7 being a control sound source intended to reduce the noises by generating a control sound to be interfered with the noises within the vehicular compartment 1 of the automotive vehicle.

In addition, in the first preferred embodiment, a piezoelectric element actuator 9 is disposed which provides an external force for a vehicular body panel so as to control vibration modes of the vehicle body panel and constitutes an actuator to control the sound vibration state of the automotive vehicle.

A control unit 11 using neural nets therein receives output signals from the microphone 3 and piezoelectric element sensor 5. The control unit 11 outputs signals to control the loud speaker 7 and piezoelectric element actuator 9.

At the same time, the control unit 11 compares a control predicted value based on the output control signals thereof with a control target value so that parameters of the neural network, for example, connection weights are corrected on the basis of the comparison result.

It is noted that although, in the first embodiment, the piezoelectric element sensor 5 and piezoelectric element actuator 9 are disposed within the vehicular compartment 1 in addition to the microphone 3 and loud speaker 7, this is because the noises in the vehicular compartment 1 are constituted by continuous synthesis of vibration responses on the vehicle body and sound field within the vehicular compartment 1.

It is, furthermore, noted that although each of the items such as microphone 3, piezoelectric element sensor 5, and piezoelectric actuator 9 are shown only single in number for the easiness in explanation, each of these elements may be multiple in number. For example, a number of microphones 3 are disposed respectively on head rest positions of respective passenger's seats, a number of loud speakers 7 are disposed on right and left door positions opposing to front seats and rear passenger's seats of the vehicle, and a number of piezoelectric element sensors 5 and a number of piezoelectric element actuators 9 may be distributed separately on a vehicular body roof portion and right and left door portions.

Figure 2:
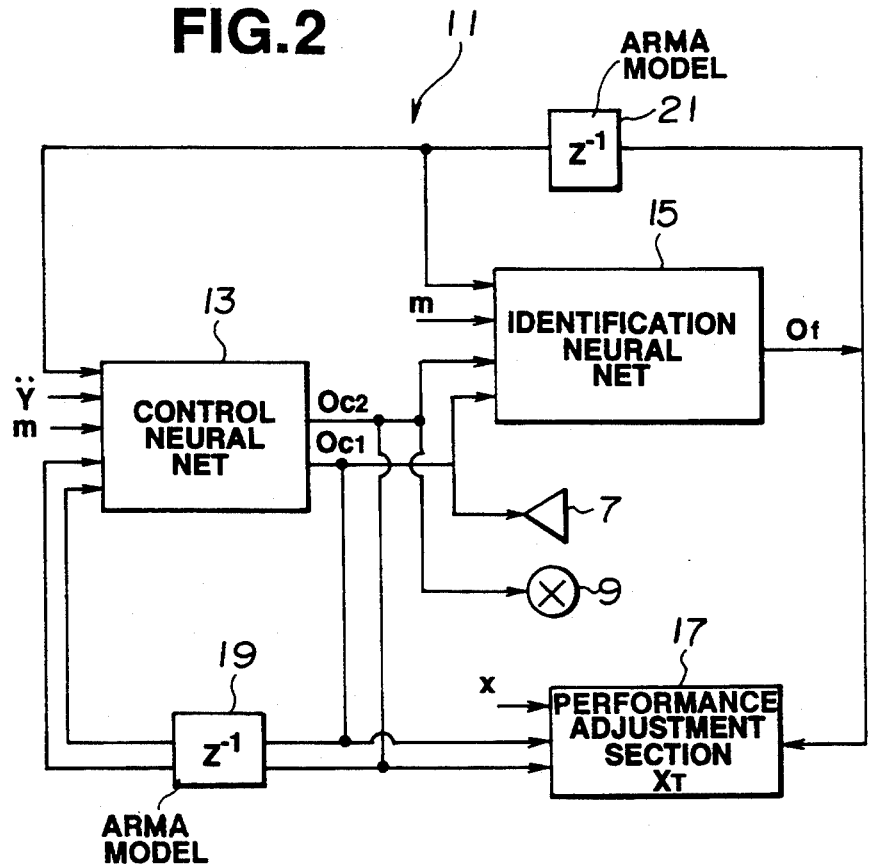
FIG. 2 is a schematic circuit block diagram of a control unit of the active control system shown in FIG. 1.

FIG. 2 shows a rough block diagram of the control unit 11.

As shown in FIG. 2, the control unit 11 includes a control neural net 13, an identification neural net 15, a performance/adjustment section 17, delay elements 19 and 21, and a memory portion (not shown) to accomodate the past data to be used for ARMA model based feedback control.

The above-described control neural net 13 receives an output m of the microphone 3 and output signal Y of the piezoelectric element sensor 5. The control neural net 13 outputs the signal $O_{c1}$ to control the loud speaker 7 and outputs the other signal $O_{c2}$ to control the piezoelectric actuator 9.

The above-described identification neural net 15 outputs a control predicted value $O_f$ on the basis of responses of the automotive vehicle through a previously identified actuator control. That is to say, the identification neural net 15 receives the output signals $O_{c1}$ and $O_{c2}$ of the control neural net 13 and the output signal m of the microphone 3 and outputs the control predicted value $O_f$.

The above-described perfomance/adjustment section 17 calculates a difference between the output signal $O_f$ of the identification neural net 15 and a control target value $X_T$ after the identification neural network 15 sufficiently represents a dynamic characteristic of a controlled object, i.e., sufficiently identifies the response of the vehicular compartment and corrects the connection weights of the control neural net 13 through a back propagation using the difference value.

The above-described delay elements 19, 21 (denoted by $Z^{-1}$) and the memory portion constitute the control neural net 13 and identification neural net 15 on the basis of an ARMA (Autoregressive Moving Average) model.

The one delay element 19 supplies the control signals of $O_{c1}$, $O_{c2}$, such as those at times of $(t-1 \times \Delta t)$, $(t-2 \times \Delta t)$, ... before a present time t at which the microphone 3 and piezoelectric element sensor 5 has detected the noise state to the control neural network 13. Therefore, the control neural net 13 is provided with neuron elements receiving; the time delayed signals (past data).

The other delay element 21 supplies data such as those at an instant of time $(t-1 \times \Delta t)$, $(t-2)$, - - - , $(t-2 \times \Delta t)$ before the present instant of time t at which the output signal $O_f$ is derived by the identification neural net 15 to the control neural net 13 and to the identification neural net 15. Hence, both neural nets 13 and 15 are provided with neuron elements receiving past data of the output signal $O_f$ of the identification neural net 15, respectively.

In the way described above, the control neural net 13 outputs control signals $O_{c1}$ and $O_{c2}$ at the present time t according to the past data and signal inputs of m and Y and the identification neural net 15 predicts and outputs the control predicted value $O_f$ at a future time of $(t+\Delta t)$ after the detection time of t. Therefore, since a prediction control in a future occurrence can be carried out even when an external environment of the automotive vehicle abruptly varies, a quick control response can be achieved. In addition, when the prediction control is carried out, the prediction is carried out always using the latest value so that an appropriate prediction can be carried out.

Figure 3A:
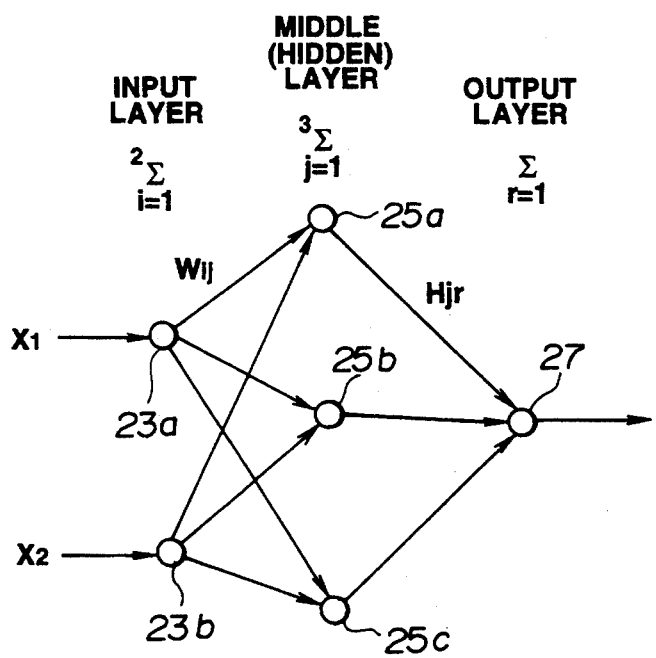
FIGS. 3 (A) and 3 (B) are explanatory views of a part of the neural network shown in FIG. 2.
Figure 3B:
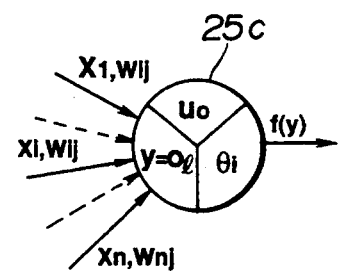

FIGS. 3 (A) and 3 (B) show parts of each of the neural nets, FIG. 3 (A) and FIG. 3 (B) show one unit (neuron element) of middle layers (hidden layers) (for example, 25c) of the neural net.

The neural net includes an input layer, a number of middle layers (hidden layers), and an output layer.

The input layer can be provided with a number neurons elements 23a and 23b (only two is shown in the figure), the middle layers can be provided with a number neurons elements (only three are shown in the figure) 25a, 25b, and 25c, and the output layer can be provided with a number neurons elements (only one is shown in the figure).

In the neural net shown in FIGS. 3 (A) and 3 (B), connection weights $W_{ij}$ are connected to the inputs $x_1$ and $x_2$ of the neuron elements 23a and 23b, connection weights $H_{ij}$ are similarly connected to the neuron elements 25a, 25b, and 25c of the middle layer, respectively. It is noted that $ij$ denotes connection of a j-th number middle layer to an i-th number input layer and $jr$ denotes connection of a r-th number output layer to the j-th number middle layer.

Hence, an internal potential $O_l$ of each neuron by means of the connection weights $W_{ij}$ is given by:

$$O_l = \Sigma W_{ij} X_i + \Theta_i \quad (1)$$

In the equation (1), $\Theta_i$ denotes a threshold value of each neuron element.

In addition, the internal potential $O_l$ determines an output value to the neuron element. An output of the neuron network is calculated using a sigmoid function shown in FIG. 4.

$$f(y) = \frac{1}{1 + e^{-\mu_0 \cdot y}} \quad (2)$$

, wherein $y = \Sigma W_{ij} \cdot X_i + \Theta_l = O_l$.

Figure 4:
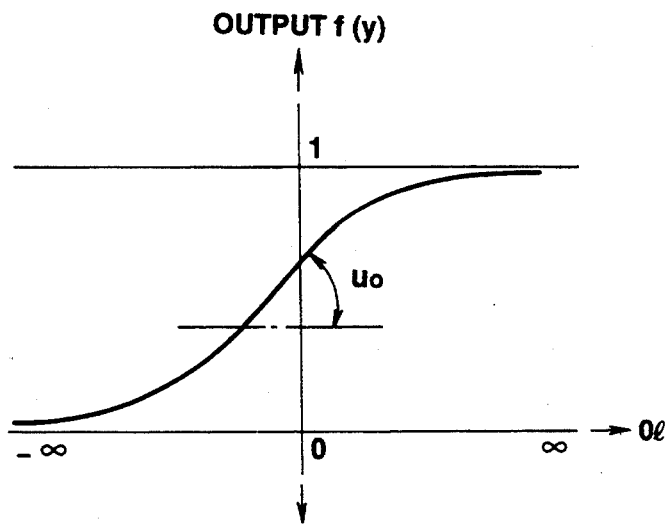
FIG. 4 is a characteristic graph of a sigmoid function adopted in the neural network shown in FIGS. 3 (A) and 3 (B).

In the equation (2), $\mu_0$ denotes a gradient of the sigmoid function of FIG. 4. Determiniation of the gradient $\mu_0$ can cope with such random signals. The output of the neural net is an output from 0 to 1.

For example, suppose that the neural net outputs a physical quantity $v = 0 \sim 100$ m/sec.

$$V = \frac{v}{|v_{max} - v_{min}|} = \frac{v}{100 - 0} \quad (3)$$

In the equation (3), v denotes the present physical quantity and V ranges from 0 to 1.

The correction of connection weights $W_{ij}$ is carried out as follows:

Suppose that an error E between the output $O_f$ of the identification neural net 15 and the control target value $X_T$ is expressed as follows:

$$E = \Sigma(X_T - O_f)^2 \quad (4)$$

A steepest descent method is used to determine $W_{ij}$ which minimizes the error E, $W_{ij}$ being the connection weights.

It is noted herein that since the output $O_f$ of the neuron element with respect to the input x is expressed as $O_f = f(y)$, the error E is a function of f (y) and E is partially differentiated with respect to $O_f$ and $O_f$ is partially differentiated with respect to connection weights $W_{ij}$.

Thus, the following equation (5) is established.

$$\frac{\partial E}{\partial W_{ij}} = \frac{\partial E}{\partial O_f} \cdot \frac{\partial O_f}{\partial W_{ij}} \quad (5)$$

$\partial E / \partial O_f$: indicating how the error E is varied along with the change in the output $O_f$.

$\partial O_f / \partial W_{ij}$: indicating how the output $O_f$ is varied along with the change in the connection weight $W_{ij}$.

Furthermore, $O_f$ is partially differentiated with respect to f(y) and f(y) is partially differentiated with respect to $W_{ij}$.

$$\frac{\partial O_f}{\partial W_{ij}} = \frac{\partial O_f}{\partial f(y)} \cdot \frac{\partial f(y)}{\partial W_{ij}} \quad (6)$$

$\partial O_f / \partial f(y)$: indicating how the output $O_f$ is varied along with a change in the function f(y)

$\partial f(y) / \partial W_{ij}$: indicating how the function f(y) is varied along with the change in the connection weight $W_{ij}$.

Hence, the connection weight $W_{ij}$ which minimizes the error E is derived from a relationship between f(y) and $O_f$.

The neural net based on the ARMA model is used to store a rate of the past state contributing to the present state in the form of the connection weights. That is to say, the noises generated from the road surface running noises and from the noises on the vehicular exterior during the vehicle run have inherent meanings in a transition in time of states of dynamic characteristics. Therefore, it is necessary to inherit such dynamic characteristics in the neural nets. It is, thus, necessary to have a structure where a history of the transition of the past state information can affect the present state to be predicted. That is to say, it is necessary to predict future responses from known previous observation data stored up to a certain interval time. In order to implement such an approach as described above, a regressive loop is installed within internal structure of the neural net.

Figure 5:
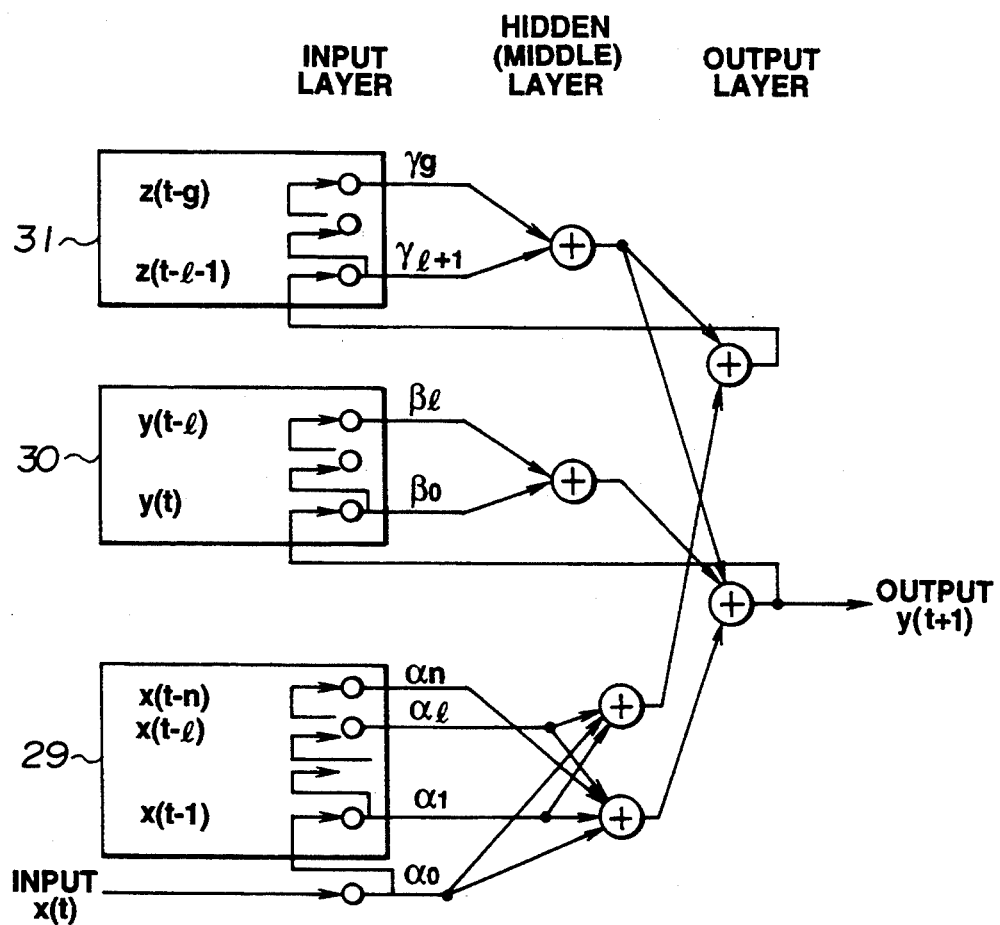
FIG. 5 is an explanatory view of the neural network based on an ARMA model.

FIG. 5 generally shows the neural net based on the ARMA model.

The neural net is provided with the input layer, middle layer, and output layer. The output y(t+1 $\Delta$t) at the time (t+1 $\Delta$t) is predicted and output in response to the input x(t) at the time t. That is to say, the predicted output x(t+1 $\Delta$t) has the relationship to the present input x(t) and past state. Newly added neuron elements connected to the three short-term (temporary) memory units 29, 30, and 31 are, therefore, provided in the input layer.

The short-term memory unit 29 stores x(t−n) from the past data ranging from x(t−n) to x(t−1) of the input x(t) and supplies the signal to the respectively corresponding input neuron elements.

The short-term memory unit 30 stores the data y (t−1 ·$\Delta$t) from the past data y(t) prior to the output y(t+1·$\Delta$t) and supplies the data y(t−1 ·$\Delta$t) to the respectively corresponding neuron elements.

The short-term memory unit 31 stores the past data ranging from x(t−g) to z(t−1−1) prior to the output y (t+1) and supplies the data z (t−g) to the corresponding neuron elements.

If a predicted error is denoted by e (t+1), a relationship between the output y (t+1) of the neural net and a detected state variable x(t+1) is:

$$x(t+1) = y(t+1) + e(t+1).$$

In this case, the predicted output y (t+1) is;

$$y(t+1) = \sum_{i=0}^{n} \alpha_i(t)x(t-i) + \sum_{j=0}^{l} \beta_j(t)y(t-j) + \sum_{k=l+1}^{g} \gamma_k(t)Z(t-k) \quad (7)$$

Hence, prediction coefficients $\alpha$, $\beta$, and $\gamma$ are corrected to appropriate values when a least square estimation method is applied to the error series e (t+1).

Next, an operation of the active control system in the first embodiment will be described with reference to FIGS. 6 through 10.

Figure 6:
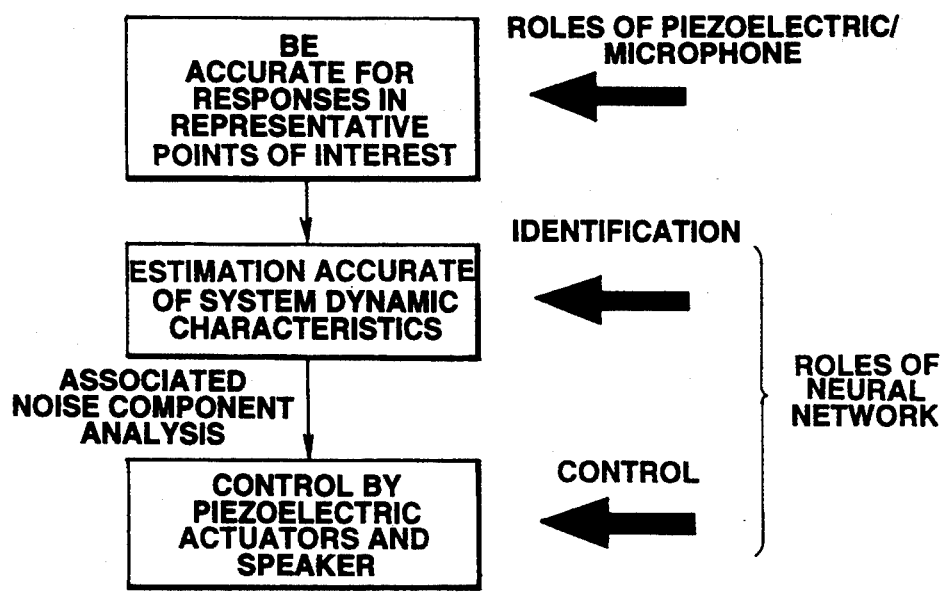
FIG. 6 is a schematic explanatory view of an action of the first preferred embodiment shown in FIGS. 1 through 5.

FIG. 6 shows a rough operational flow in the first embodiment.

The active control system in the case of the first embodiment shown in FIG. 1 is operated as generally shown in FIG. 6.

Referring back also to FIG. 1, the responses of representative points within the vehicular compartment 1 are accurately picked by means of the piezoelectric element sensor 5 and microphone 3.

The dynamic characteristics of the system are more accurately identified by means of the control unit 11.

The control unit 11 carries out a continuous synthesis analysis for the space of the vehicular compartment 1 based on a system identification and controls the piezoelectric element actuator 9 and loud speaker 7.

That is to say, referring back to FIG. 2, the identification neural net 15 sufficiently represents the dynamic characteristics with respect to the noises within the vehicular compartment 1, thereafter, the perfomance/adjustment section 17 calculates the difference between the predicted output signal $O_f$ of the identification neural net 15 and controlled target value $X_T$, and correspondingly the connection weights of the control neural net 13 are corrected using the value by means of the back propagation learning method.

Figure 7:
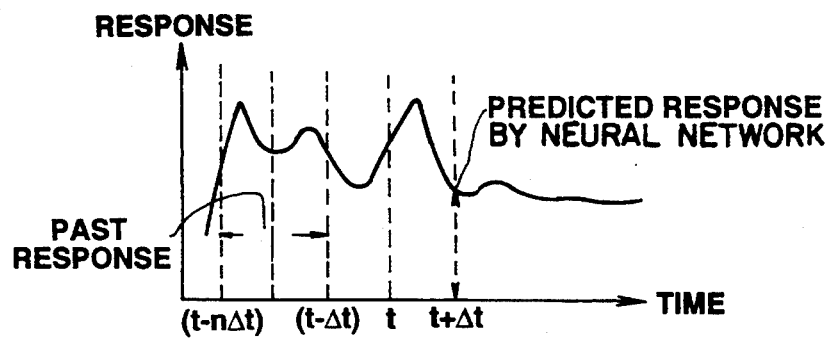
FIG. 7 is a characteristic graph of a system response prediction by neural network.

FIG. 7 shows an overview of the timing chart of the dynamic system to the response within the vehicular compartment 1.

That is to say, at the time t, the state within the vehicular compartment 1 is perceived by means of the piezoelectric element sensor 5 and microphone 3. The control unit 11 outputs signals to the loud speaker 7 and piezoelectric element actuator 9 at the time t and can achieve the noise control within the vehicular compartment at the time of t+$\Delta$t.

Then, the control result is fedback to the neural nets of the control unit 11 to correct the connection weights. Therefore, the inputs of the identification neural net 15 include the noise state variables within the vehicular compartment 1 at a certain time step t and controlled variables with respect to the noise state variables and the output thereof includes a state variable at the next time step (t+$\Delta$t).

Control performance function $E_f$ of the identification neural net 15 and control performance function $E_c$ of the control neural net 13 are expressed on the basis of the output $O_f$ of the identification neural net 15 as follows:

$$E_f = \frac{1}{2}\Sigma(X - O_f)^2, \text{ and}$$

$$E_c = \frac{1}{2}\Sigma(X_T - O_f)^2. \quad (8)$$

wherein X denotes a present state, $X_T$ denotes a desired state the value of which is set to the designed, and $O_f$ denotes a state which the neural net predicts.

In the equation (8), X denotes the detected state variable at the time step t+$\Delta$t and $X_T$ denotes a state variable of an object to be controlled. Hence, if the identification neural net 15 accurately identifies the dynamic characteristics with respect to the noises in the vehicle compartment 1, the performance function $E_f$ becomes lower than a predetermined criterion value so that the error $E_c$ between the output $O_f$ of the identification neural net 15 and target state variable $X_T$ may wholly be considered to be generated by means of the control neural net 13.

Figure 8:
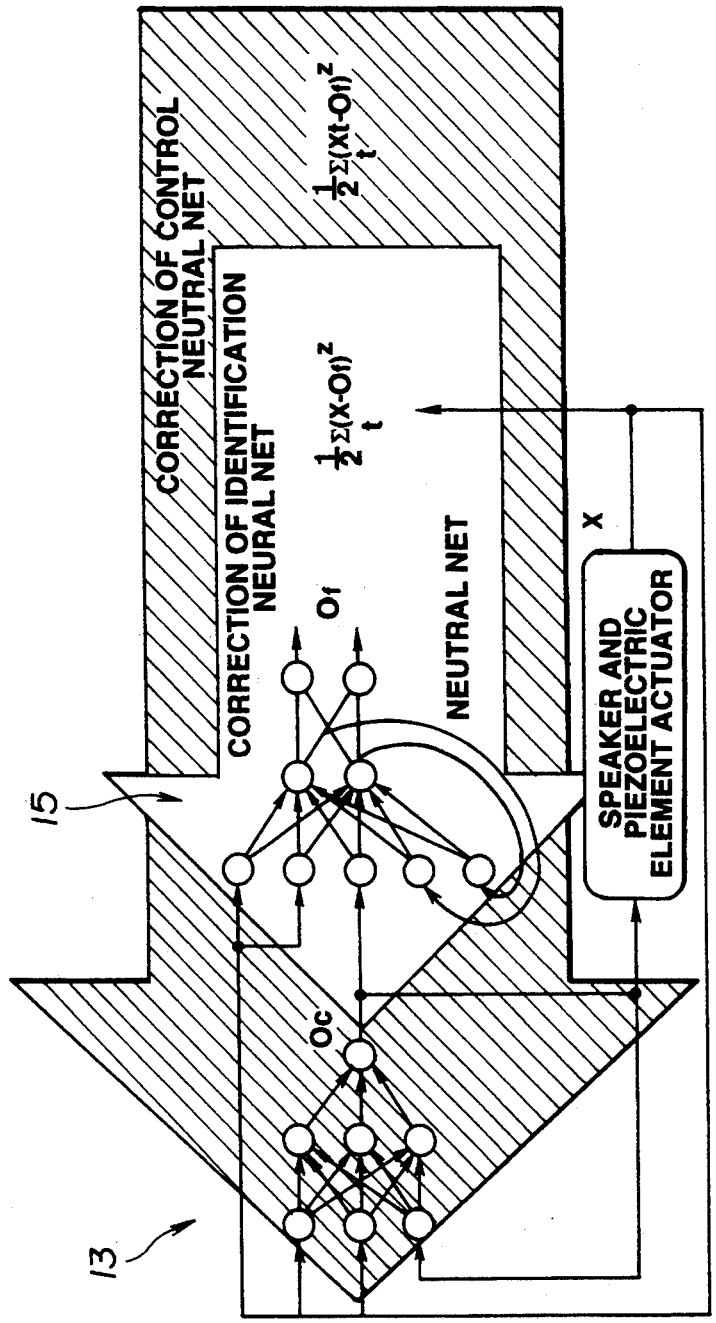
FIG. 8 is an explanatory view of a back propagation neural network.

Hence, the error information is back propagated as shown in FIG. 8 to return to the control neural network 13 so that the whole adjustment of parameters of the control unit 11 can be made.

Figure 9:
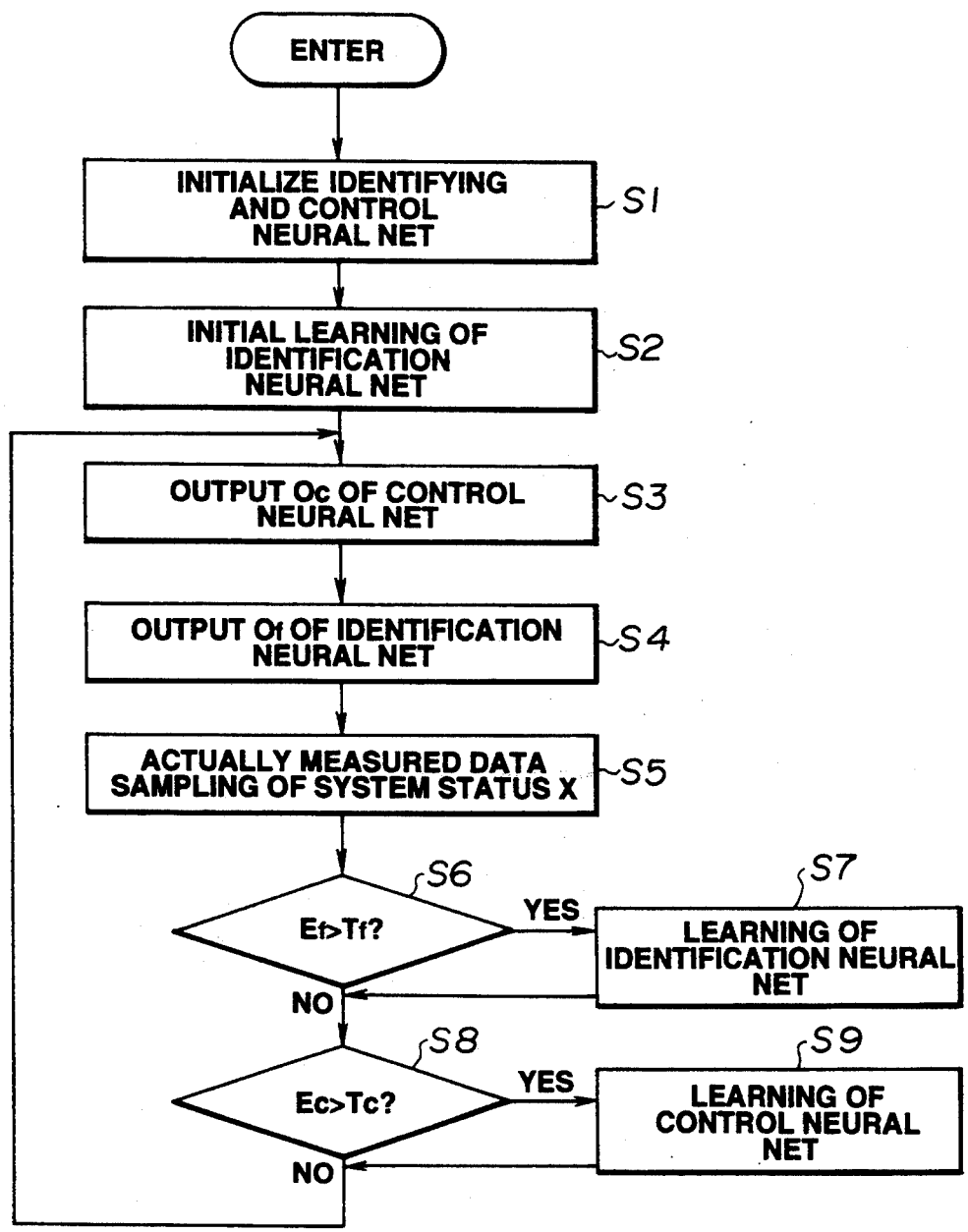
FIG. 9 is an operational flowchart in the case of the first preferred embodiment.

Next, FIG. 9 shows an operational flowchart to explain the control operation of the first preferred embodiment according to the present invention.

At a step S1, both the control neural net 13 and identification neural net 15 are initialized. This initialization is determined using a random function for the connection weights W, threshold value $\Theta$, the gradient coefficient $\mu_0$ of the sigmoid function.

At a step S2, an initial learning of the identification neural net 15 is carried out.

The initial learning is carried out in an off line mode on the basis of a predefined program. Upon completion of the initial learning at the step S2, the identification neural net 15 is incorporated into the control unit 11 as shown in FIG. 2.

After the initial learning for the identification neural net 15 is ended, the control neural net 13 is operated and its outputs $O_c$ of the control neural net 13 are carried out at a step S3.

The outputs $O_c$ cause the loud speaker 7 and piezoelectric actuator 9 to be actuated and are also supplied simultaneously to the identification neural net 15. Thus, the identification neural net 15 outputs the predicted state variable $O_f$ at the time of $t+\Delta t$.

At a step S5, an actually measured data of the state variable X at the time $t+\Delta t$ is sampled. In addition, since tile ARMA model is utilized, the past state variables are written into the memory unit.

At a step S6, the control unit 11 carries out the determination of identification.

That is to say, at the step S6, the control unit 11 determines whether the identification neural net 15 is accurately identifies the dynamic characteristics on the noises within the vehicular compartment 1. Specifically, a performance function $E_f$ of the identification neural net 15 which has been calculated as in the equation (8) using the actually measured state variable X and the predicted output $O_f$ is larger than a predetermined convergence criterion $T_f$.

If $E_f$ is larger than $T_f$, the routine goes to a step S7 since the identification neural net 15 sufficiently identifies the system. At the step S7, the evaluation/adjustment section 17 corrects and learns the connection weights W of the identification neural net 15 by means of the evaluation/adjustment section 17.

Next, tile routine goes to a step S8 in which a determination of whether an adaptive control should be performed or not is carried out.

This determination is based on the determination of whether the noise state within the vehicular compartment 1 becomes a target state. Specifically, the performance function $E_c$ calculated in the above equation (8) from the target state variable $X_T$ and output $O_f$ of the identification neural net 15 is determined whether it is larger than the predetermined convergence criterion $T_c$. If $E_c$ is larger than $T_c$, the control neural net 13 is not sufficiently identified. Therefore, the routine goes to a step S9 in which the back propagation causes the correction and learning of the connection weights W of the control neural net 13.

Thereafter, the routine from the step S3 to the step S9 is repeated in cyclic order so that the noises within the vehicular compartment 1 are controlled in a feedforward control mode.

In details, the identification neural network 15 previously identifies the dynamic characteristics on the noises within the vehicular compartment 1 in the off line mode. Then, the control neural net 13 receives past signals of the output signals $O_{c1}$ and $O_{c2}$ of the control neural network 13 and past signals of the output $O_f$ of the identification neural net 15 and outputs the control signals $O_{c1}$ and $O_{c2}$. It is noted that the control neural network 13 operates and outputs the signals of $O_{c1}$ and $O_{c2}$ in order to reflect the past data after the data have been received for all input neuron elements previously installed to input the past data.

Then, the loud speaker 7 is actuated in response to the output $O_{c1}$ and the control sound signal having a phase opposite to the noise is output from the loud speaker 7 into the vehicular compartment 1.

In addition, the output signal $O_{c2}$ causes the piezoelectric actuator 9 to be actuated so that vibration modes of the vehicle body are controlled.

As a consequence, the continuously coupled synthesized space in the nonlinear characteristic is controlled so that the reduction of noises can be achieved.

The identification neural net 15 inputs the output signals $O_{c1}$ and $O_{c2}$ of the control neural network 13 and inputs the output signal m of the microphone 3 as a state variable within the vehicular compartment 1 and the past data of the output signal $O_f$. Then, the identification neural net 15 predicts and outputs the output signal $O_f$ at the time $t+\Delta t$. The output $O_f$ is based on the noise state within the vehicular compartment 1 at the present time, an external force, and past data. It can be said that, from the output $O_f$, the accurate prediction is carried out even if the noise state due to the random input is present.

Then, when the output $O_f$ and the actually measured data X of the noise state within the vehicular compartment 1 are compared, the learning of the identification neural net 15 is carried out on the basis of the comparison result.

Suppose now that the identification neural network 15 accurately identifies the dynamic characteristic of the system, the performance/adjustment section 17 causes the learning of the neural net 13 for the output $O_f$ of the identification neural net 15 and the target state variable $X_T$.

Figure 10:
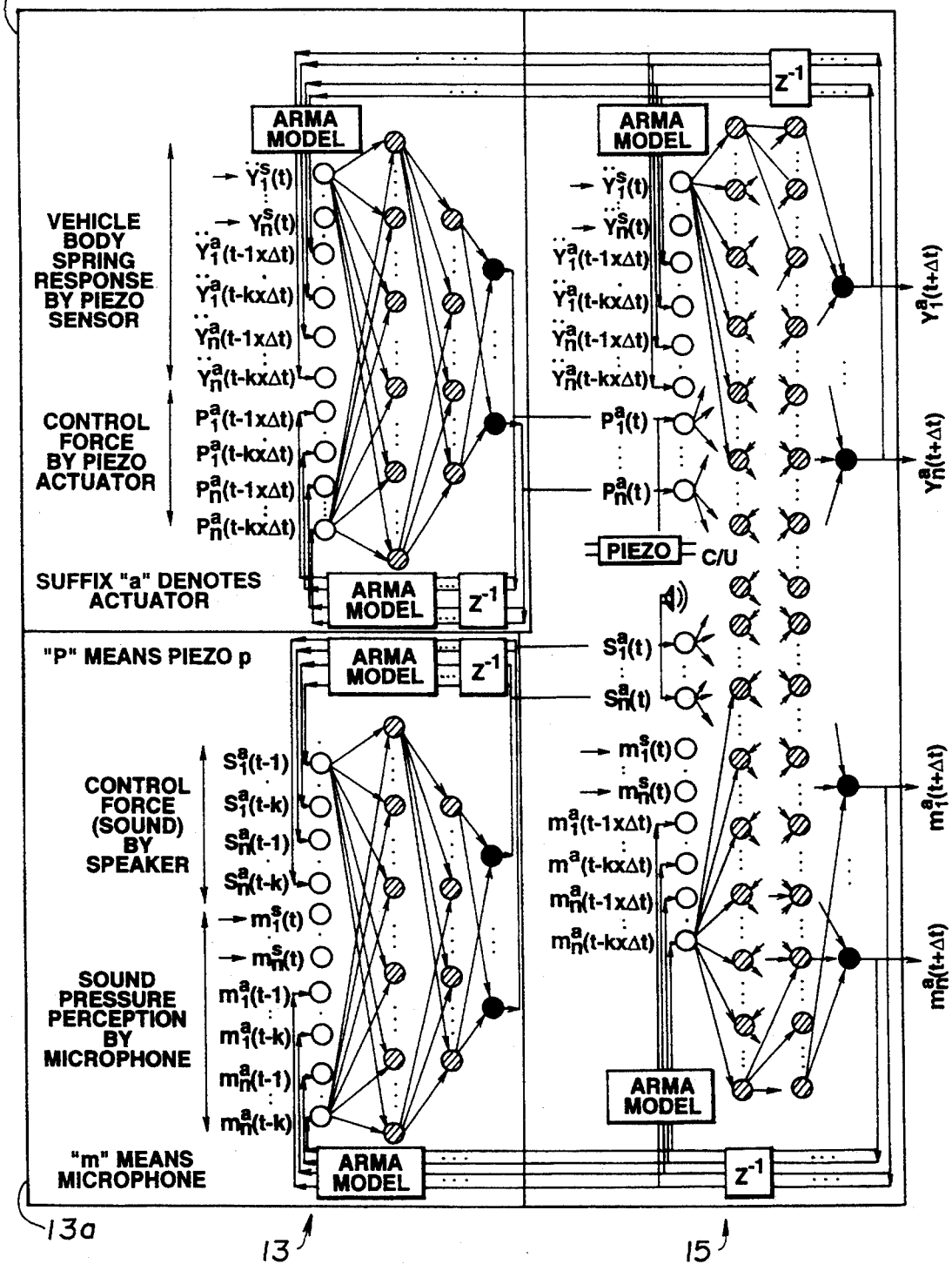
FIG. 10 is a schematic structural diagram of the neural network.

FIG. 10 shows a specific structure of the neural net used in the first preferred embodiment according to the present invention.

The neural net is based on the ARMA model as described above. The control neural net 13 includes the sound field control neural network 13a and structural control neural network 13b. Each neural network includes the input layer, middle layer, and output layer.

In FIG. 10, ○ denotes the input layer, with oblique lines denotes the middle (hidden) layers, and denotes the output layer.

Each neuron element of the input layer ○ receives sound pressure perception signals of the n number microphones at the time t ($m=m_1^s(t) \sim m_n^s(t)$), past data $m_1^a(t-1) \sim m_1^a(t-k)$, $m_n^a(t-1) \sim m_n^a(t-k)$ from the time to the time $(t-1)$ to the time $(t-k)$, and control forces $S_1^a(t-1) \sim S_1^a(t-k)$, and $S_1^a(t-1) \sim S_n^a(t-1) \sim S_n^a(t-k)$. It is noted that a superscript 's' denotes the detected signal from the sensors and a superscript 'a' denotes the processed actuator signal produced by the neural network.

The output $O_{c1}$ at the present time t of the sound field control neural network 13a is expressed as:

$$O_{c1} = S_1^a(t) \sim S_n^a(t) \tag{9}$$

The output $O_{c1}$ is output as the control force to the n number of loud speakers and input to the corresponding neuron element of the input layer of the identification neural network 15.

The past data of the output $O_{c1} = S_1^a(t) \sim S_n^a(t)$ is stored and is supplied to the input layer of the sound field neural network 13a by means of the delay element 19 as described above.

The input layer of the identification neural net 15 receives the microphone sound pressure perception signals m ($m=m_1^s(t) \sim m_n^s(t)$) at the present time t and past data $m_1^a(t-1) \sim m_1^a(t-k)$, $m_n^a(t-1) \sim m_n^a(t-k)$ of the sound pressure perception signals.

In addition, the input layer of the structural control neural network 13b receives vehicular body panel response detection signals Y $(Y=Y_1^s(t) \sim Y_n^s(t))$ from the n number piezoelectric element sensors and receives the past data $Y_1^a(t-1) \sim Y_1^a(t-k)$ and $Y_n^a(t-1) \sim e$,uml y $_n^s(t-k)$. Furthermore, the input layer of the structural control neural network 13b receives the past control signal of the n number of piezoelectric actuators $P_1^a(t-1) \sim P_1^a(t-k)$ and $P_n^a(t-1) \sim P_n^a(t-k)$.

The output $O_{c2}$ at the time t of the structural neural net 13b is $O_{c2} = P_1^a(t) \sim P_n^a(t)$.

The output $O_{c2}(=P_1^a(t) \sim P_n^a(t))$ is output to the n number of piezoelectric element actuators and is supplied to the input layer of the identification neural network 15.

In addition, the output $O_{c2}$ $(=P_1^a(t) \sim P_n^a(t))$ is sequentially stored and is input to the input layer of the structural control neural network 13b as described above.

The input layer of the identification neural network 15 receives the vehicle body spring response signal Y $(Y=Y_1^s(t) \sim Y_n^s(t))$ detected at the time t and receives the past data of $Y_1^a(t-1) \sim Y_1^a(t-k)$ and $Y_n^a(t-1) \sim Y_n^a(t-k)$.

The identification neural network 15 outputs the predicted value $O_f$ of the microphone detection signal at the time $t + \Delta t$ as $O_f = m_1^a(t+\Delta t) \sim m_n^a(t+\Delta t)$.

As the predicted values of the piezoelectric element sensors, $O_f$ are output $(O_f = Y_1^a(t+\Delta t) \sim Y_n^a(t+\Delta t))$.

It is noted that the output $O_f$ of the identification neural network 15 $(O_f = m_1^a(t+\Delta t) \sim m_n^a(t+\Delta t)$ is sequentially stored and input to each input layer of the identification neural network 15 and sound field control neural network 13a as their past data.

The other output $O_f$ than the identification neural network 15 $(O_f = Y_1^a(t+\Delta t) \sim Y_n^a(t+\Delta t))$ are sequentially stored therein so that as the past data the stored data are input to the input layers of the identification neural network 15 and structural control Hence, the performance function $E_f$ of the identification neural network 15 is:

$$E_f = \frac{1}{2} \sum_{i=1}^{n} (m_1^s(t+\Delta t) - m_1^a(t+\Delta t))^2 + \frac{1}{2} \sum_{i=1}^{n} (Y_1^s(t+\Delta t) - Y_1^a(t+\Delta t))^2$$

The control performance function $E_c$ of the sound field control neural network 13a is:

$$E_c = \frac{1}{2} \sum_{t=1}^{n} m_n^a(t+\Delta t)^2 \quad (10)$$

(The desired state is 0).

Furthermore, the control performance function $E_c$ of the structural control network 13b is:

$$E_c = \frac{1}{2} \sum_{i=1}^{n} Y_n^a(t+\Delta t)^2$$

(The desired state is 0).

Hence, using these performance functions $E_f$ and $E_c$, the connection weights W of the identification neural network 15 and control neural network can appropriately be corrected and learned through the back propagation.

It is noted that although, in the first preferred embodiment, the neural networks for both control and identification neural networks are used on the basis of the ARMA model, the ARMA model may be a basis for at least control neural network.

Figure 11:
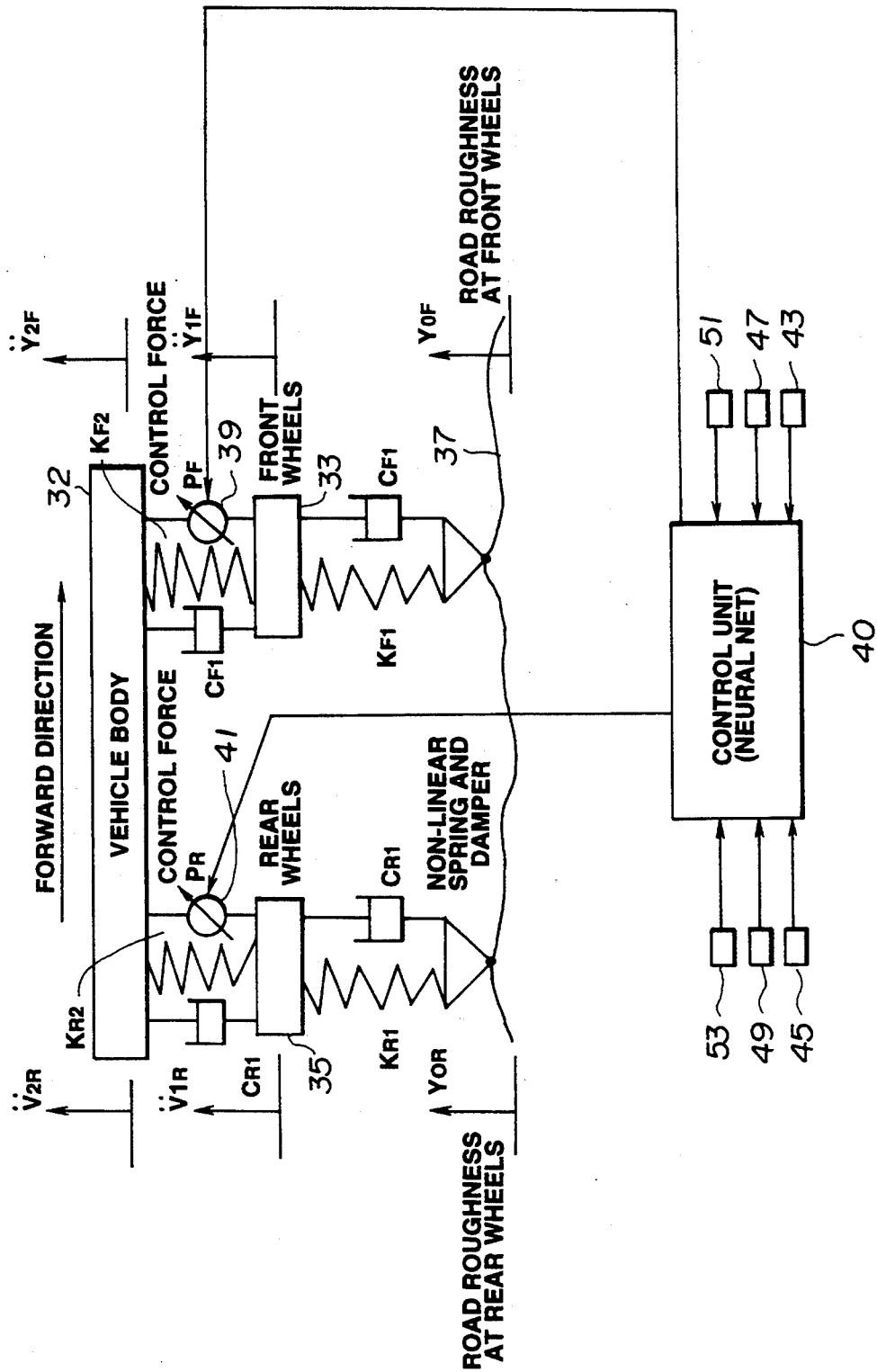
FIG. 11 is a schematic block diagram of a second preferred embodiment of the active control system according to the present invention.

FIG. 11 shows a second preferred embodiment of the active control system according to the present invention.

In the second preferred embodiment, the active control system is applicable to a vibration control system for vehicular suspension units.

In FIG. 11, front tire wheels 33 and rear tire wheels 35 are grounded on a road surface 37. The suspension units are located at respective four tire wheels.

In the suspension units, a spring constant between the front tire wheels 33 and vehicle body 32 is denoted by $K_{F2}$, a damping coefficient is denoted by $C_{F1}$, and a spring constant between the front wheels 33 and road surface 37 is denoted by $C_{F1}$.

In addition, a spring constant between the rear tire wheels 35 and the vehicle body is denoted by $K_{R2}$, a damping coefficient therebetween is denoted by $C_{R1}$. A spring constant between the rear tire wheels 35 and road surface 37 is denoted by $K_{R1}$ and a damping coefficient therebetween is denoted by $C_{R1}$.

Furthermore, a vertical displacement of the road surface 37 at the front tire wheels 33 is denoted by $Y_{OF}$, a vibration acceleration on the front tire wheels 33 (unsprung mass) is denoted by $Y_{1F}$, the vibration acceleration of the vehicle body 32 (sprung mass) at the front tire wheels 33 is denoted by $Y_{2F}$, the vertical displacement of the road surface 37 at the rear tire wheels 35 is denoted by $Y_{OR}$, the vibration acceleration on the rear tire wheels 35 (unsprung mass) is denoted by $Y_{1R}$, and the vibration acceleration of the vehicle body 32 (sprung mass) at the rear tire wheels 35 is denoted by $Y_{2R}$.

A vibration control unit 39 is interposed between the front tire wheels 33 and vehicle body 32 to provide a control force $P_F$ therebetween so as to reduce the vibrations.

Another vibration control unit 41 is interposed between the rear tire wheels 35 and vehicle body 32 to provide a control force $P_R$ so as to reduce the vibrations.

A control unit 40 receives output signals from front tire wheel side road surface detector 43 which is so constructed as to detect a roughness $Y_{OF}$ of the road surface 37 on which the vehicle front tire wheels 33 are grounded and from the rear tire wheel side road surface detector 45 which is so constructed as to detect a roughness $Y_{OR}$ of the road surface 37 on which the vehicle rear tire wheels 35 are grounded.

In addition, the control unit 40 receives output signals from a front tire wheel vibration acceleration detector 47 which is so constructed as to detect the vibration acceleration around the front tire wheels 33 and from a rear tire wheel vibration acceleration detector 49 which is so constructed as to detect the vibration is acceleration around the rear tire wheels 35.

Furthermore, the control unit 40 receives output signals from a forward vibration acceleration detector 51 which is so constructed as to detect a front tire wheel side vibration acceleration on the vehicle body 32 at the front tire wheel side and from a rear tire wheel side vibration acceleration detector 53 which is so constructed as to detect a rearward vibration acceleration of the vehicle body 32 at the rear tire wheel side.

These detectors 43, 45, 47, 49, 51, and 53 constitute vibration state detecting means detecting vibration states on the respective suspension units.

The neural nets are used in the control unit 40 in the same way as the first preferred embodiment.

The control unit 40, i.e., the neural network receives the output signals from the detectors 43, 45, 47, 49, 51, and 53 and outputs control signals to the vibration control units 39 and 41. In addition, the connection weights of the neural net:work are corrected by comparing control predicted values based on the control signals described above with control target values.

Figure 12:
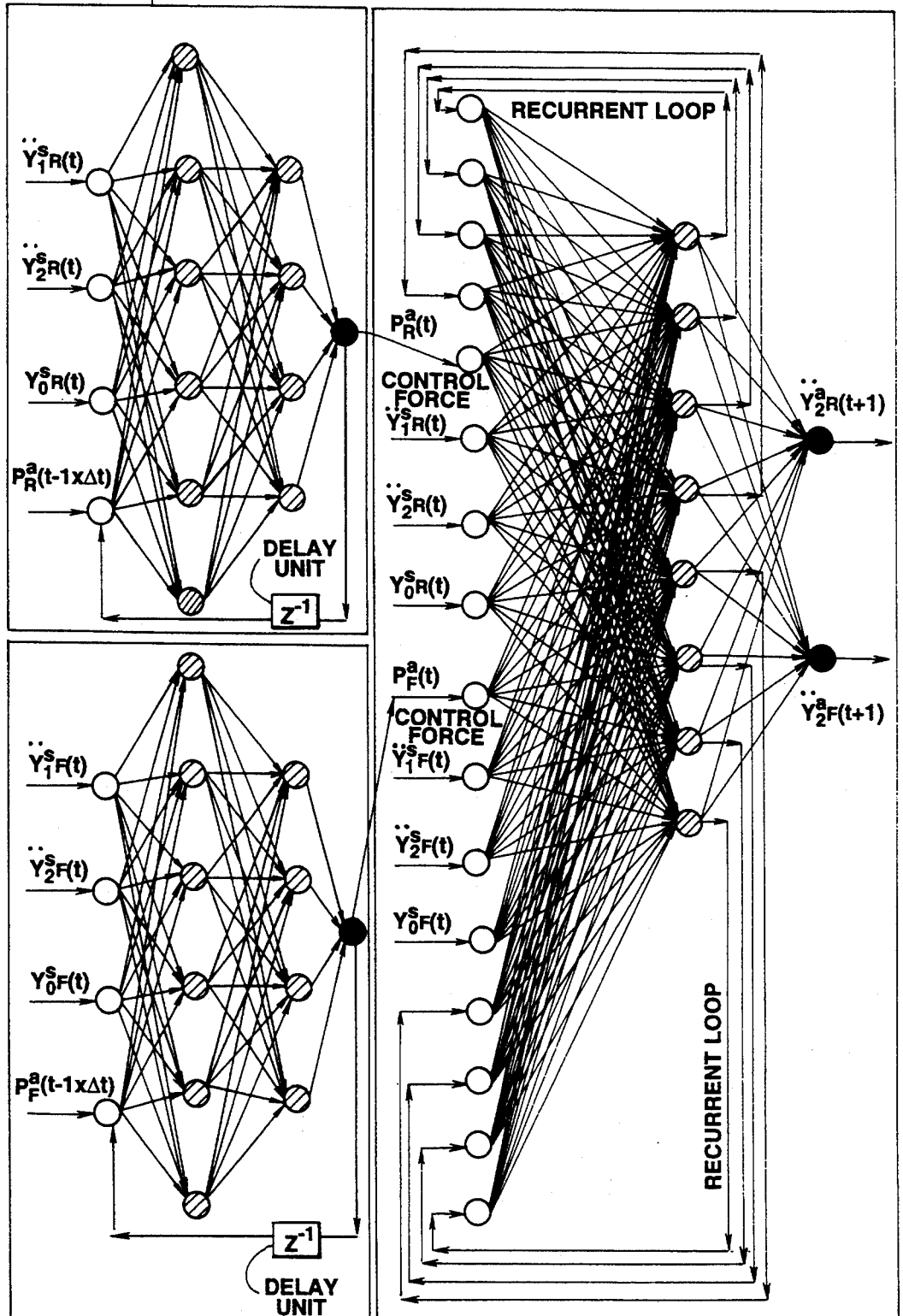
FIG. 12 is a schematic structural view of the neural network in a second preferred embodiment according to the present invention.

FIG. 12 shows a structure of the neural network incorporated in the control unit 40.

In the same way as in the case of the first embodiment, the neural network includes a control neural net 55 and identification neural net 57.

The control neural net 55 includes a front tire wheel control neural network 55a and a rear tire wheel control neural network 55b.

Each control neural network 55a and 55b includes an input layer denoted by ○, two stages of middle layers denoted by with oblique lines, and an output layer denoted by . The identification neural network 57 includes an output layer denoted by ○, a middle layer denoted by with oblique lines, and an output layer denoted by .

In the second preferred embodiment, only the control neural network 55 is the neural network based on the ARMA model. That is to say, the input layer of the front tire wheel side control neural network 55a receives, at a time t, a detection signal $Y_{OF}{}^s(t)$ of the front tire wheel side road surface detector 43, a detection signal $Y_{1F}{}^s(t)$ of the front tire wheel acceleration detector 47, and a detection signal $Y_{2F}{}^s(t)$ of the forward vehicle body acceleration detector 51, respectively.

The output signal $O_C$ of the front tire wheel side control neural network 55a serves as a control force $P_F{}^a(t)$ to the vibration control unit 39.

The output signal $P_F{}^a(t)$ is supplied to the identification neural network 57 and sequentially stored into a memory unit so as to be input to the input layer of the front tire wheel control neural network 55a as a past data $P_F{}^a(t-1)$.

In addition, the series of operations described above is carried out in the same way as in the case of the rear tire wheel control neural net 55b. The input signals of the rear tire wheel control neural net 55b include detection signals: $Y_{OR}{}^s(t)$, $Y_{1R}{}^s(t)$, and $Y_{2R}{}^s(t)$ of the detectors 45, 49, and 53 and past data $P_R{}^s(t-1)$ of the control force $O_c (=P_R{}^a(t))$ of the rear tire wheel side vibration control unit 41. The output signal $O_c(=P_R{}^s(t))$ is output to the vibration control unit 41 and input to the identification neural network 57.

The input layer of the identification neural net 57 furthermore receives detection signals $Y_{OF}{}^s(t)$, $Y_{1F}{}^s(t)$, $Y_{2F}{}^s(t)$, $Y_{OR}{}^s(t)$, $Y_{1R}{}^s(t)$, and $Y_{2R}{}^s(t)$ of the respective detectors 43, 45, 49, 51, and 53.

Furthermore, the input layer of the identification neural net 57 receives the output of the middle layer. This is generally called "recurrent" so constructed as to be enabled to eliminate noises of a signal. For example, the recurrent can also be constructed by bringing the output of the middle layer to the input middle layer itself.

The identification neural network 57 outputs $O_f$ which represents the vibration acceleration of the vehicle body 32 at a next time $(t+1)$:

$$O_f = Y_{2F}{}^a(t+1), Y_{2R}{}^a(t+1) \tag{11}$$

Hence, the performance function $E_f$ of the identification neural net 57 is:

$$E_f = \tfrac{1}{2}\{((Y_{2R}{}^s(t+1) - Y_{2R}{}^a(t+1))^2 + (Y_{2F}{}^s(t+1) - Y_{2F}{}^a(t+1))^2\} \tag{12}$$

Hence, the performance function $E_c$ of the control neural net 55 is:

$$E_c = \tfrac{1}{2}\{(Y_{2R}{}^a(t+1))^2 + (Y_{2F}{}^2(t+1))^2\} \tag{13}$$

If, therefore, the performance function $E_f$ becomes below a predetermined criterion value and the identification neural network 57 represents accurately the dynamic characteristics of the vehicle body 32 to the vibration inputs, in the second preferred embodiment, the performance function $E_c$ is used to correct and learn the connection weights W of the control neural network 55 so that an appropriate feedforward control of the suspension vibration control can be achieved.

The recurrent of the identification neural network 57 in the case of the second preferred embodiment can be used for the control neural network 55 and, furthermore, can be applied to the neural network in the first preferred embodiment. In addition, although, in the case of the second preferred embodiment, a single data at the time of $(t-1)$ as the past data has been explained, several time delayed data may alternatively be considered in the same way as in the case of the first preferred embodiment.

As described hereinabove, the active control system according to the present invention has, for example, the following advantages:

(1) The system dynamic characteristics can appropriately be identified by the control system using the neural networks and the sound vibration state of the vehicle can appropriately be controlled in the feedforward control mode.

(2) The vehicular compartment noises can appropriately be controlled in the feedforward control mode by means of the control system using the neural network. Hence, even if the noises in the vehicular compartment are based on the synthesis of the input from the engine, the input from the suspension units, exhaust noise from the muffler, noises generated at the vehicular exterior during the vehicle run, the continuous synthesis of the noises can appropriately be analyzed and the noises can appropriately be reduced.

(3) The suspension vibrations can appropriately be controlled by means of the control system using the neural network in the feedforward control mode.

Hence, even if the vehicle runs on a rough road as well as freeway, the vibration characteristics of the suspension units can appropriately be analyzed and the vehicle vibrations can appropriately be reduced.

(4) The control predicted value is output by the installation of the identification neural network as well as the control neural network so that the correction of parameters (such as connection weights and/or threshold value) in the control neural network can appropriately be carried out.

(5) Since the control predicted values after the present time by receiving the past data before the present time of the detection and control are predicted and output, the sound vibration state can appropriately be projected even if the input is of the random characteristic. Therefore, an appropriate control can be achieved for the random input.

It will fully be appreciated by those skilled in the art that the foregoing description has been made to the preferred embodiments and various changes and modifications may be made without departing from the scope of the present invention which is to be defined by the appended claims.

What is claimed is:

1. An active control system comprising:
   a) an actuator which is so constructed as to control a noise and/or vibration state of an automotive vehicle;
   b) noise and/or vibration state detecting means for detecting the noise and/or vibration state of the vehicle and producing a noise and/or vibration indicative signal indicative of the noise and/or vibration state; and
   c) a control unit using a neural net which is so constructed as to receive the signal from said noise and/or vibration state detecting means and compare a control predicted value based on the noise and/or vibration indicative signal with a control target value so as to correct a parameter of the neural net, said control unit outputting a signal to said actuator to control said noise and/or vibration state of said automotive vehicle.

2. An active control system as set forth in claim 1, wherein said neural net of the control unit includes a control neural net and an identification neural net, said control neural net receiving the noise and/or vibration indicative signal and producing a signal to control said actuator and said identification neural net producing said control predicted value on the basis of a response of the vehicle to the control of said actuator previously identified.

3. An active control system as set forth in claim 1, wherein said control unit includes a neuron element which is so constructed as to receive at least the control signal of said actuator as a data before the present time at which said noise and/or vibration state detecting means detects the noise and/or vibration state and to produce the control signal to said actuator at the present time so that the control predicted value after the present time at which said noise and/or vibration state detecting means detects the noise and/or vibration state is predicted and output.

4. An active control system comprising:
   a) an actuator which is so constructed as to control a noise and/or vibration state of an automotive vehicle;
   b) noise and/or vibration state detecting means for detecting the noise and/or vibration state of the vehicle and producing a noise and/or vibration indicative signal indicative of the noise and/or vibration state; and
   c) a control unit using a neural net which is so constructed as to receive the signal from said noise and/or vibration state detecting means and compare a control predicted value based on the noise and/or vibration indicative signal with a control target value so as to correct a parameter of the neural net, wherein said neural net of the control unit includes a control neural net and an identification neural net, said control neural net receiving the noise and/or vibration indicative signal and producing a signal to control said actuator and said identification neural net producing said control predicted value on the basis of a response of the vehicle to the control of said actuator previously identified, and wherein said control unit includes a neuron element which is so constructed as to receive at least the control signal of said actuator as a data before the present time at which said noise and/or vibration state detecting means detects the noise and/or vibration state and to produce the control signal to said actuator at the present time so that the control predicted value after the present time at which said noise and/or vibration state detecting means detects the noise and/or vibration state is predicted and output.

5. An active control system as set forth in claim 4, wherein said noise and/or vibration state detecting means comprises a microphone located on a first predetermined position of a vehicular compartment of the automotive vehicle and outputs a first signal (m) indicative of the detected sound vibration state and a piezoelectric element sensor located on a second predetermined position of the vehicular compartment to which a vehicle body panel is attached and outputs a second signal (Y) indicative of the detected noise and/or vibration state and wherein said actuator comprises a loud speaker located on a third predetermined position of the vehicular compartment and outputs a control sound in response to the control sound signal (Oc1) from said control unit, said control sound being interfered with the noises in the vehicular compartment and a piezoelectric actuator located on a fourth predetermined position of the vehicular compartment to which the vehicular body panel is attached and outputs a control vibrating force in response to the control signal (Oc2) from said control unit.

6. An active control system as set forth in claim 5, wherein said control unit further includes a performance/adjustment section, a memory section, and delay elements, said evaluation/adjustment section deriving a difference between the output (Of) of the identification neural net and the control target value ($X_T$) after said identification neural net sufficiently identifies a dynamic characteristic of a response of the vehicular compartment and carrying out a correction of connection weights ($W_{ij}$) of the control neural net using the calculated difference value, said one of the delay elements providing a predetermined time delay for the control signals (Oc1, Oc2) to transmit the delayed control signals (Oc1, Oc2) to the control neural net, said other of the delay elements providing the predetermined time delay for the output signal (Of) of the identification neural net to transmit the delayed output signal to both the identification neural net and the control neural net.

7. An active control system as set forth in claim 6, wherein the control neural net receives past data of its output signals (Oc1, Oc2), first and second signals (m, Y) of said microphone and piezoelectric actuator and outputs the control signals (Oc1, Oc2) at the present time (t) and said identification neural net receives past data of its output signal (Of) and, first and second signals (m, Y), and predicts and outputs the signal (Of) of a predicted value at time ($t+\Delta t$) after an interval of time $\Delta t$ from the present detecting time (t).

8. An active control system as set forth in claim 7, wherein each neural net, in general, comprises an input layer, a number of middle (hidden) layers, and an output layer, each having a number of neuron elements to properly represent the system.

9. An active control system as set forth in claim 8, wherein the input layer has connection weights ($W_{ij}$) for two inputs thereto ($x_1$, $x_2$) and the middle layer has connection weights ($H_{jr}$) for the output layer, wherein $ij$ denotes the connection of i-th number input layer to j-th number middle layer, wherein an internal potential of each neuron element by means of the connection weights ($W_{ij}$) are $O_1 = \Sigma W_{ij} x_i + \Theta_i$, wherein $\Theta_i$ denotes a threshold value of each neuron element, and wherein the output value of each neural net is expressed as $f(y) = 1/(1 + e^{-u_o y})$ ($y = \Sigma W_{ij} \cdot X_i + \Theta_l = 0_l$, wherein $u_o$ denotes a gradient of a sigmoid function $f(y)$, and $X_i$ denotes an n-th number input.

10. An active control system as set forth in claim 9, wherein the correction of connection weights ($W_{ij}$, $H_{jr}$) is carried out by means of a steepest descent method so as to derive correct values of neural network parameters $W_{ij}$ and $H_{jr}$ in order to minimize an error E ($E = \Sigma (X_T - O_f)^2$).

11. An active control system as set forth in claim 10, wherein each neural net based on an ARMA model has an input layer, a middle (hidden) layer, and an output layer and predicts and outputs the signal $y(t+1)$ at a time of $(t+1 \Delta t)$ according to an input $x(t)$, the input layer having a newly added neuron element connected to three-short term memory units, the first short-term memory unit storing $x(t - n\Delta t)$, past data from $x(t - n\Delta t)$ to $x(t - 1\Delta t)$ of the input $x(t)$ and fed thereout to the corresponding neuron element, the second short-term memory unit storing the past data from $y(t - 1\Delta t)$ to $y(t)$ of the output $y(t + 1\Delta t)$ and fed thereout to the corresponding neuron element, and the third short-term memory unit storing the past data from $z(t - g)$ to $z(t - (1+1)\Delta t)$ of the output $y(t + 1\Delta t)$ and fed thereout to the corresponding neuron element, the input signal $x(t)$ being input to one neuron element of the middle layer with a prediction coefficient $\alpha_0$ attached, each signal of the first short-term memory unit being attached with prediction coefficients $\alpha_1$ through $\alpha_n$, each signal of the second short-term memory unit being attached with prediction coefficients $\beta_0$ through $\beta_l$, each signal of the third short-term memory unit being attached with prediction coefficients $\gamma_{l+1}$ through $\gamma_g$ and read thereout to the corresponding neuron element of the middle layer.

12. An active control system as set forth in claim 11, wherein a relationship between the output $y(t + 1\Delta t)$ of the neural net and a detected state variable $x (t + 1\Delta t)$ is $x(t + 1 \cdot \Delta t) = y (t + 1 \cdot \Delta t) + e(t + 1 \cdot \Delta t)$ and $y(t + 1 \cdot \Delta t) = \Sigma \alpha_i(t) x(t - 1 \cdot \Delta t) + \Sigma \beta_j(t) y(t - j \cdot \Delta t) + \Sigma \gamma_k(t) z(t - k \cdot \Delta t)$, and wherein prediction coefficients $\alpha$, $\beta$, and $\gamma$ are corrected using a least square estimating method for the error series E.

13. An active control system as set forth in claim 12, wherein a control performance function $E_f$ for the identification neural net is $E_f = \frac{1}{2}\Sigma(X - O_f)^2$ and a performance function of the identification neural net is $E_c = \frac{1}{2}\Sigma(X_T - O_f)^2$, wherein X denotes the detected state variable, $X_T$ denotes a desired state, $O_f$ denotes a predicted state of the neural net.

14. An active control system as set forth in claim 13, wherein said control unit determines whether $E_f > T_f$, wherein $T_f$ denotes a convergence determination criterion and when $E_f > T_f$, the correction of connection weights is carried out through a back propagation to the identification neural net.

15. An active control system as set forth in claim 14, wherein said control unit determines whether $E_c > T_c$, wherein $T_c$ denotes a convergence determination criterion for the control neural net and when $E_c > T_c$, the correction of connection weights for the control neural net is carried out through a back propagation to the control neural net.

16. An active control system as set forth in claim 15, wherein the noises in the vehicular compartment are controlled in a feedforward control mode.

17. An active control system as set forth in claim 16, wherein said microphone includes a plurality of microphones having n-th number of microphones, said piezoelectric element sensor includes a number of piezoelectric element sensors, said loud speaker includes a number of loud speakers, said piezoelectric actuator includes a number of piezoelectric actuators and wherein said control neural net comprises a sound field neural network and a structural control neural network, each of said neural networks being based on the ARMA model.

18. An active control system as set forth in claim 17, wherein the input layer of the sound field neural network receives sound pressure perception signals m ($= m_1^s(t)$ through $m_n^s(t)$, past data thereof $m_1^a(t - 1\Delta t)$ through $m_1^a(t - k \cdot \Delta t)$, $m_n^a(t - 1 \cdot \Delta t)$ through $m_n^a(t - k \cdot \Delta t)$ and control forces $S_1^a(t - 1 \cdot \Delta t)$ through $S_1^a(t - k \cdot \Delta t)$ at the times of $(t - 1 \cdot \Delta t)$ through $(t - k \cdot \Delta t)$, and the control forces $S_1^a(t - 1 \cdot \Delta t)$ through $S_1^a(t - k \cdot \Delta t)$, $S_n^a(t - 1 \cdot \Delta t)$ through $S_n^a(t - k)$ at the times of $(t - 1 \cdot \Delta t)$ through $(t - k \cdot \Delta t)$, wherein a superscript 's' denotes the detected signal of each microphone and a superscript 'a' denotes a processed signal of the corresponding neural network, and output layer thereof outputs $Oc1 = S_1^a(t)$ through $S_n^a(t)$ to the 1 through n-th loud speakers and to the input layer of said identification neural network, the input layer of said identification neural network receives the sound pressure perception signals m ($= m_1^s(t)$ through $m_n^s(t)$) of the respective microphones and past data thereof $m_1^a(t - 1 \cdot \Delta t)$ through $m_1^a(t - k \cdot \Delta t)$, $m_n^a(t - 1 \cdot \Delta t)$ through $m_n^a(t - k \cdot \Delta t)$ and the output layer of said identification neural network outputs $O_f$ as predicted values of the first detection signals of the respective microphones as $O_f = m_1^a(t + \Delta t)$ through $m_n^a(t + \Delta t)$ and outputs $O_f$ as predicted values of the second detection signals of the respective piezoelectric element sensors as $O_f = Y_1^a(t + \Delta t)$ through $Y_n^a(t + \Delta t)$ and input layer of said structural control neural network receives the vehicle body panel spring response detection signals at the present time (t) from the n-th number of piezoelectric element sensors as $Y = Y_1^s(t)$ through $Y_n^s(t)$, past data thereof as $Y_1^a(t - 1 \cdot \Delta t)$ through $Y_1^a(t - k \cdot \Delta t)$, $Y_n^a(t - 1 \cdot \Delta t)$ through $Y_1^a(t - k \cdot \Delta t)$ and past data of the n-th number of piezoelectric element actuators $P_1^a(t - 1 \cdot \Delta t)$ through $P_1^a(t - k \cdot \Delta t)$ through $P_n^a(t - k \cdot \Delta t)$ and the output layer of said structural neural network outputs Oc2 as $P_1^a(t)$ through $P_n^a(t)$.

19. An active control system as set forth in claim 18, wherein the performance function of the identification neural network is $E_f = \frac{1}{2}\Sigma(m_1^s(t + \Delta t) - m_1^a(t + \Delta t))^2 + \frac{1}{2}\Sigma(Y_1^s(t + \Delta t) - Y_1^a(t + \Delta t))^2$, the performance function of the sound field neural network is $E_c = \frac{1}{2}\Sigma m_n^a(t + \Delta t)^2$, and the performance function of the structural neural network is $E_c = \frac{1}{2}\Sigma Y_n^a(t + \Delta t)^2$.

20. An active control system comprising:
a) a control sound source which is so constructed as to generate a control sound to be interfered with noises in a vehicular compartment to reduce the noises;
b) noise state detecting means for detecting a noise state and producing a signal indicative of the noise state; and
c) a control unit, interposed between said control sound source and said noise state detecting means, using a neural net which is so constructed as to receive the noise state indicative signal and compare a control predicted value based on the noise state indicative signal with a control target value to correct at least one parameter of the neural net, said control unit outputting a signal to said control sound source to generate said control sound.

21. An active control system comprising:
a) a vibration control unit which is so constructed as to provide control forces for suspension units of an automotive vehicle to reduce vibrations;
b) vibration state detecting means for detecting vibration States for the suspension units of the vehicle and for producing signals indicative of the vibration states; and
c) a control unit, interposed between said vibration control unit and said vibration state detecting means, using a neural net which is so constructed as to receive the vibration state indicative signals and to compare control predicted values based on the vibration state indicative signals with control target values to correct at least one parameter of the neural net, said control unit outputting a signal to said vibration control unit to provide said control forces.

22. An active control system comprising:
a) a vibration control unit which is so constructed as to provide control forces for suspension units of an automotive vehicle to reduce vibrations;
b) vibration state detecting means for detecting vibration states for the Suspension units of the vehicle and for producing signals indicative of the vibration states; and
c) a control unit using a neural net which is so constructed as to receive the vibration state indicative signals and to compare control predicted values based on the vibration state indicative signals with control target values to correct at least one parameter of the neural net,
wherein said vibration state detecting means includes: a) front tire wheel side road surface condition detecting means for detecting a road surface condition at a front tire wheel side of the automotive vehicle; b) rear tire wheel side road surface condition detecting means for detecting a road surface condition at a rear tire wheel side of the automotive vehicle; c) front tire wheel vibration acceleration detecting means for detecting a vibration acceleration at the front tire wheels; d) rear tire wheel vibration detecting means for detecting a vibration acceleration at the rear tire wheels; e) front tire wheel side vehicle body vibration acceleration detecting means for detecting a vehicle body vibration at the front tire wheel side; and f) rear tire wheel side vehicle body vibration acceleration detecting means for detecting a vehicle body vibration at the rear tire wheel side and wherein said vibration control unit includes a first vibration control unit which provides a first control force $P_F$ between the front tire wheels and vehicle body at the front tire wheel sides in response to the output signal from said control unit and a second vibration control unit which provides a second control force $P_R$ between the rear tire wheels and the vehicle body at the rear tire wheel side.

23. An active control system as set forth in claim 22, wherein the neural net includes a control neural net and identification neural net, said control neural net being based on an ARMA model and including a front tire wheel control neural net and rear tire wheel control neural net, and each neural net having an input layer, a middle layer, and an output layer.

24. An active control system as set forth in claim 23, wherein the input layer of said front tire wheel control neural net receives detection signal $Y_{0F}{}^s(t)$ from said front tire wheel side road surface condition detecting means at the present time t, detection signal $Y_{1F}{}^s(t)$ from the front tire wheel vibration acceleration detecting means, and front tire wheel side vehicle body vibration acceleration detecting means $Y_{2F}{}^s(t)$, respectively, and the output layer of the front tire wheel control neural net provides an output signal $O_c$ indicative of the first control force $P_F{}^a(t)$ for the first vibration control unit, the output control force $P_F{}^a(t)$ being input to the identification neural net and being sequentially stored therein so as to input to the input layer of the front tire wheel control neural net as a past data $P_F{}^a(t-1)$, wherein the input layer of said rear tire wheel control neural net receives detection signal $Y_{0R}{}^s(t)$ from said rear tire wheel side road surface condition detecting means at the present time t, detection signal $Y_{1R}{}^s(t)$ from the rear tire wheel vibration acceleration detecting means, and rear tire wheel side vehicle body vibration acceleration detecting means $Y_{2R}{}^s(t)$, respectively, and the output layer of the rear tire wheel control neural net provides an output signal $O_c$ indicative of the first control force $P_R{}^a(t)$ for the first vibration control unit the output control force $P_R{}^a(t)$ being input to the identification neural net and being sequentially stored therein so as to input to the input layer of the rear tire wheel control neural net as a past data $P_F{}^a(t-1)$, and wherein the input layer of the identification neural net further receives detection signals $Y_{0F}{}^s(t)$, $Y_{1F}{}^s(t)$, $Y_{2F}{}^s(t)$, $Y_{2F}{}^s(t)$, $Y_{0R}{}^s(t)$, $Y_{1R}{}^s(t)$, and $Y_{2R}{}^s(t)$ from all of the respective vibration acceleration detecting means and further receives an output from its middle layer so as to constitute a recurrent structure therein and the output layer of the identification neural net outputs $O_f$ the vibration acceleration of the vehicle body at a time t+1 as $O_F = Y_{2F}{}^a(t+1)$, $Y_{2R}{}^a(t+1)$, wherein a superscript s denotes each of the detected and output signals of the respective detecting means and a superscript a denotes each of the processed signals by the neural nets.

25. An active control system as set forth in claim 24, wherein a performance function $E_f$ of the identification neural net is $E_f = \frac{1}{2}\{(Y_{2R}{}^s(t+1) - Y_{2R}{}^a(t+1))^2 + (Y_{2F}{}^s(t+1) - Y_{2F}{}^a(t+1))^2\}$ and a performance function $E_c$ of the control neural net is $E_c = 1/2\{(Y_{2R}{}^a(t+1)) + (Y_{2F}{}^a(t+1))^2\}$.

26. An active control system as set forth in claim 25, wherein if $Ec < Tc$, Tc denotes a predetermined determination criterion of the performance function of the identification neural net, connection weights of the control neural net are corrected and learned according to the performance function $E_f$ of the control neural net and said control unit controls the vibrations on the vehicle body via said first and second vibration control units in a feedforward control mode.

27. An active control system comprising:
   a) an actuator which is so constructed as to control a noise and/or vibration state of an automotive vehicle;
   b) noise and/or vibration state detecting means for detecting the noise and/or vibration state of the vehicle and producing a noise and/or vibration indicative signal indicative of the noise and/or vibration state; and
   c) a control unit using a neural net which is so constructed as to receive the signal from said noise and/or vibration state detecting means and compare a control predicted value based on the noise and/or vibration indicative signal with a control target value so as to correct a parameter of the neural net;
   and wherein said neural net of the control unit includes a control neural net and an identification neural net, said control neural net receiving the noise and/or vibration indicative signal and producing a signal to control said actuator and said identification neural net producing said control predicted value on the basis of a response of the vehicle to the control of said actuator previously identified.

28. An active control system comprising:
   a) an actuator which is so constructed as to control a noise and/or vibration state of an automotive vehicle;
   b) noise and/or vibration state detecting means for detecting the noise and/or vibration state of the vehicle and producing a noise and/or vibration indicative signal indicative of the noise and/or vibration state; and
   c) a control unit, interposed between said actuator and said noise and/or vibration state detecting means, using a neural net which is so constructed as to receive the signal from said noise and/or vibration state detecting means and compare a control predicted value based on the noise and/or vibration indicative signal with a control target value so as to correct a parameter of the neural net, said control unit outputting a signal to said actuator to control said actuator.

* * * * *